(12) United States Patent
Yang et al.

(10) Patent No.: US 6,847,002 B1
(45) Date of Patent: Jan. 25, 2005

(54) MICROELECTRODE MACHINING DEVICE

(75) Inventors: Ching-Cheng Yang, TaiChung (TW);
Jui-Kuan Lin, TaiChung (TW);
Chao-Chuang Mai, TaiChung (TW);
Hsin-Chuan Su, YunLin Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/793,778

(22) Filed: Mar. 8, 2004

(30) Foreign Application Priority Data

Dec. 26, 2003 (TW) ........................................ 92136945 A (51) Int. Cl.$^7$ .............................. B23H 7/02; B23H 7/10
(52) U.S. Cl. .................................................. 219/69.12
(58) Field of Search ........................... 219/69.12, 69.15, 219/69.17

(56) References Cited

U.S. PATENT DOCUMENTS 4,900,890 A * 2/1990 Masaki et al. ........... 219/69.17

FOREIGN PATENT DOCUMENTS

| DE | 19548001 A | * | 6/1997 | |
|----|------------|---|--------|---|
| JP | 2-76636 A | * | 3/1990 | 219/69.12 |
| JP | 2-190220 A | * | 7/1990 | 219/69.15 |
| JP | 10-175123 A | * | 6/1998 | |

* cited by examiner

Primary Examiner—Geoffrey S. Evans
(74) Attorney, Agent, or Firm—Troxell Law Office PLLC (57) ABSTRACT

The microelectrode machining device disclosed by the invention mainly comprises a platform, a wire supply mechanism, a wire guide, and two (electric conductor) elements, wherein the platform can be fixed at an EDM machine and the wire supply mechanism is arranged on the platform for providing the wire needed in the EDM process, and the wire guide disposed on the platform has an arch-slide arranged thereon and a groove arranged at a position corresponding to the middle of the arch-slide on the wire guide, in addition, the two (electric conductor)elements are arranged on the platform to supply the power needed in the EDM process, and the two (electric conductor)elements are disposed respectively at the side of wire guide, and the altitudes of the bottom of both the wheel-shaped (electric conductor)element are lower than that of the wire exit and wire entrance of the arch-slide of the wire guide, in respective. By the design of aforementioned structure, the wire supplied by the wire supply mechanism first passes through the bottom of the (electric conductor)element, and enters the arch-slide from the wire entrance and exits the same from the wire exit, and passes again through the bottom of another (electric conductor)element. In this way, the wire is subject to a minute downward suppressing force so that the wire can travel smoothly inside the arch-slide of the wire guide.

15 Claims, 8 Drawing Sheets

MICROELECTRODE MACHINING DEVICE

FIELD OF THE INVENTION

The invention relates to a microelectrode machining device, and more particularly to a microelectrode machining device capable of providing wire of high stability by changing the structure of the wire guide therein, and enabling the electrical discharge machining (EDM) to be performed on a microelectrode of non-cylindrical form, in addition, the device also may have a better machining precision.

BACKGROUND OF THE INVENTION

Figure 1A:
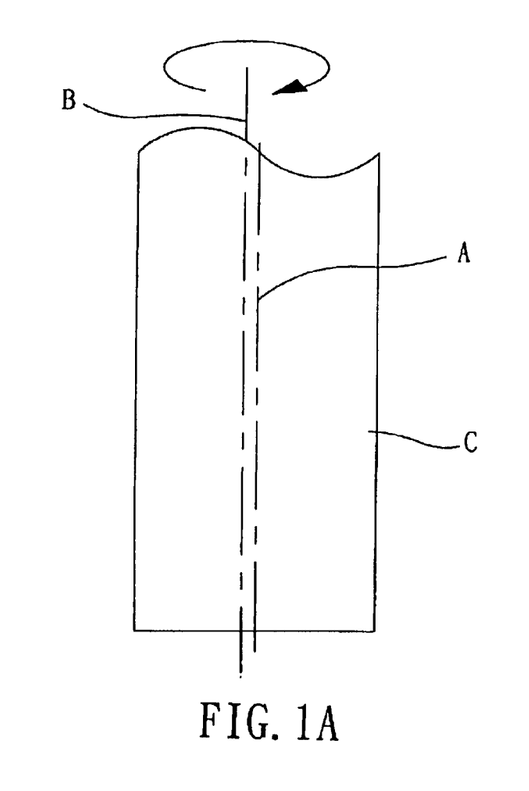
FIG. 1A is a schematic diagram showing a microelectrode which is off-centered.
Figure 1B:
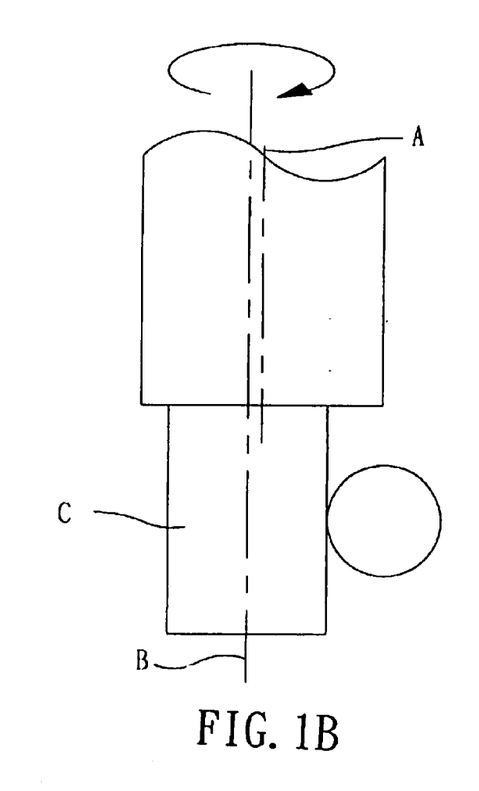
FIG. 1B is a schematic diagram showing a refinishing process of an off-centered microelectrode.

Following the fast progress and development of technology, many machining techniques with high precision are developed, such as the technique of electrical discharge machining (EDM) which the material is removed by the erosive action of electrical discharges (sparks) provided by a generator. The same phenomenon of EDM is applied at the micron level for micromachining. The process is called as micro-EDM. In general, in the conventional micro-EDM process, there is an unavoidable offset between the electrode center A and the machining center B. Therefore, the phenomena of hole enlargement or eccentric circle will happen since the electrode C is working off-centered during the machining process as shown in FIG. 1A. In order to overcome the aforementioned problem, some manufacturers perform a refinishing work to the electrode C after the electrode C is securely clamped so as to eliminate the unavoidable eccentric occurred during the clamping. The refinishing work is shown in FIG. 1B, and is addressed as "Electrical Discharge Grinding".

Figure 2:
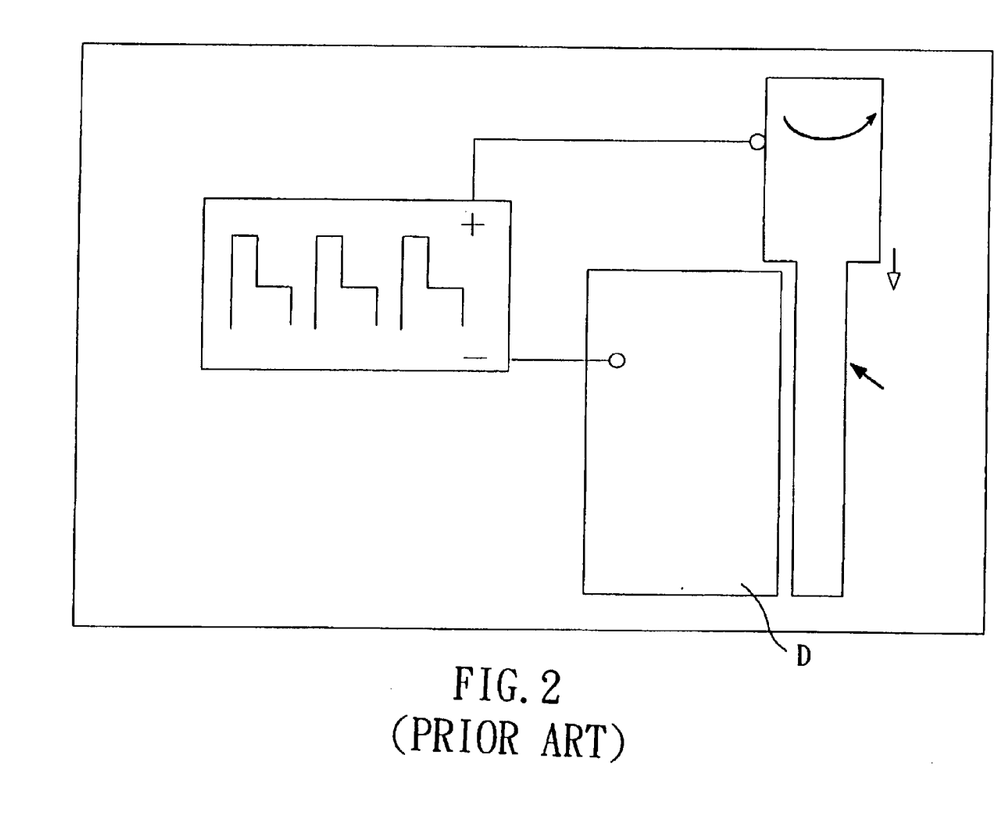
FIG. 2 is a schematic diagram showing a conventional electrical discharge machining of column electrode.
Figure 3:
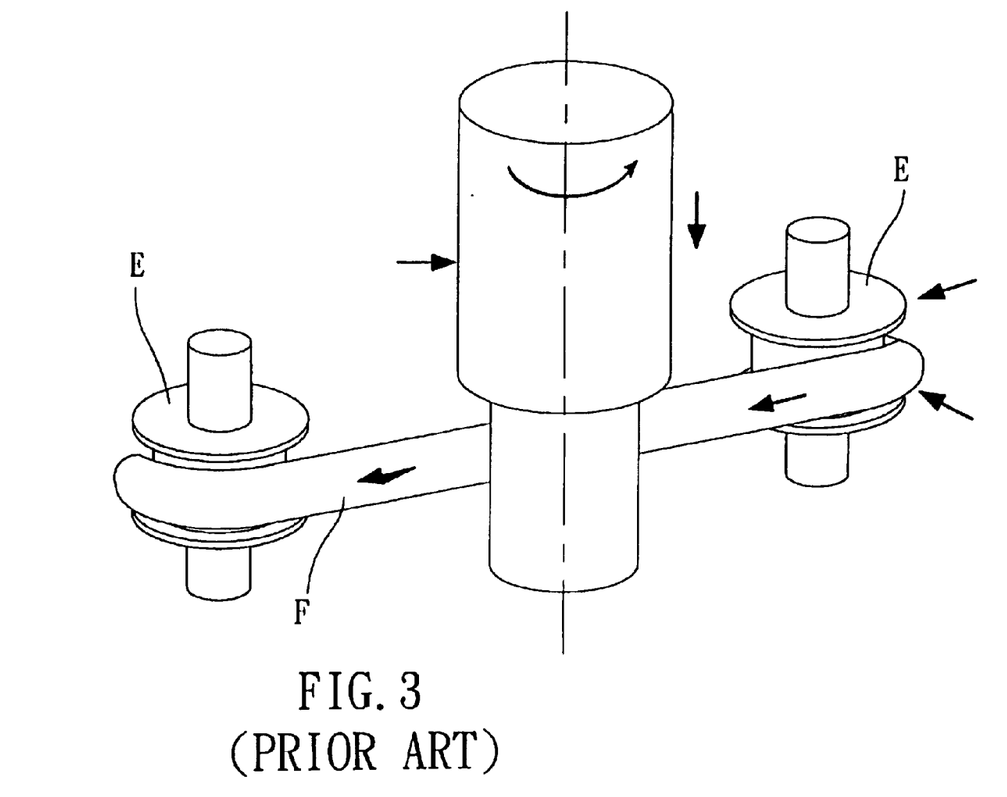
FIG. 3 is a schematic diagram showing a conventional wire-cut electrical discharge machining.

Currently, there are two micro-EDM processes being used for fabricating a microelectrode, namely, the electrical discharge machining of column electrode as shown in FIG. 2, and wire-cut electrical discharge machining as shown in FIG. 3. However, there are pros and cons of the two conventional methods, and the drawback of the former is that it is impossible to repetitiously compensate the wear and tear of the column electrode generated in the discharge machining process, and the shortcoming of the latter is that the two wire guides E are too widely arranged and cause an unstable movement of the wire electrode. Both shortcomings result in the decreasing of machining precision.

Figure 4:
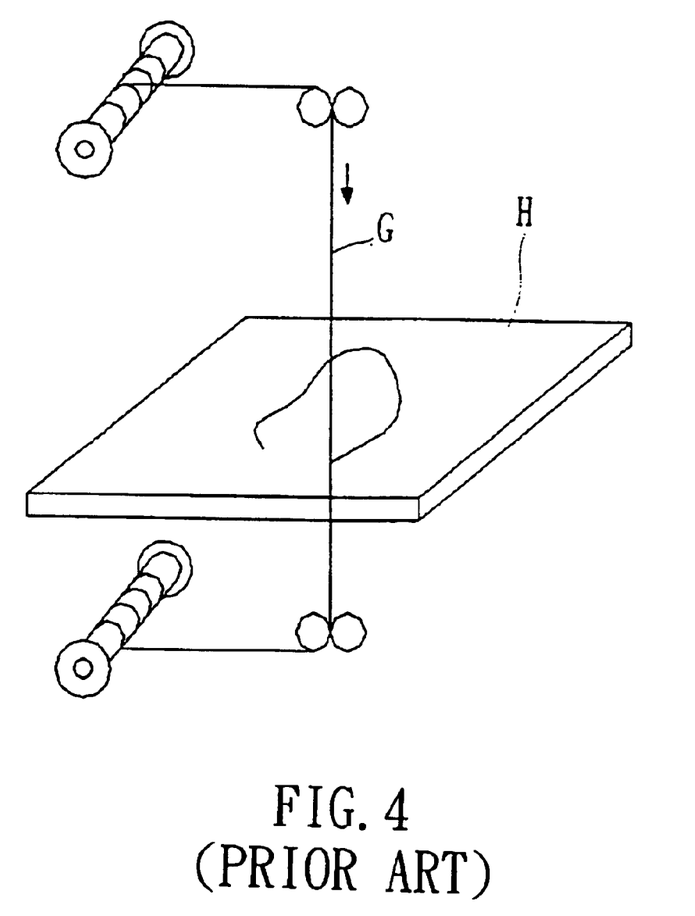
FIG. 4 is a diagram showing basic features of a conventional wire-cut EDM (WEDM) machine.

FIG. 4 shows the basic features of a conventional wire-cut EDM (WEDM) machine. The electrode G is a thin wire and it is pulled in constant tension and low speed through the workpiece H from a supply spool onto a take up mechanism. On application of a proper voltage, discharge occurs between the wire electrode and the workpiece. Brass wire is most commonly used for wire cutting that the machining is similar to the band saw machine. The wire electrode G should have sufficient tensile strength, toughness, and high conductivity, but usually can be used only once.

Figure 5:
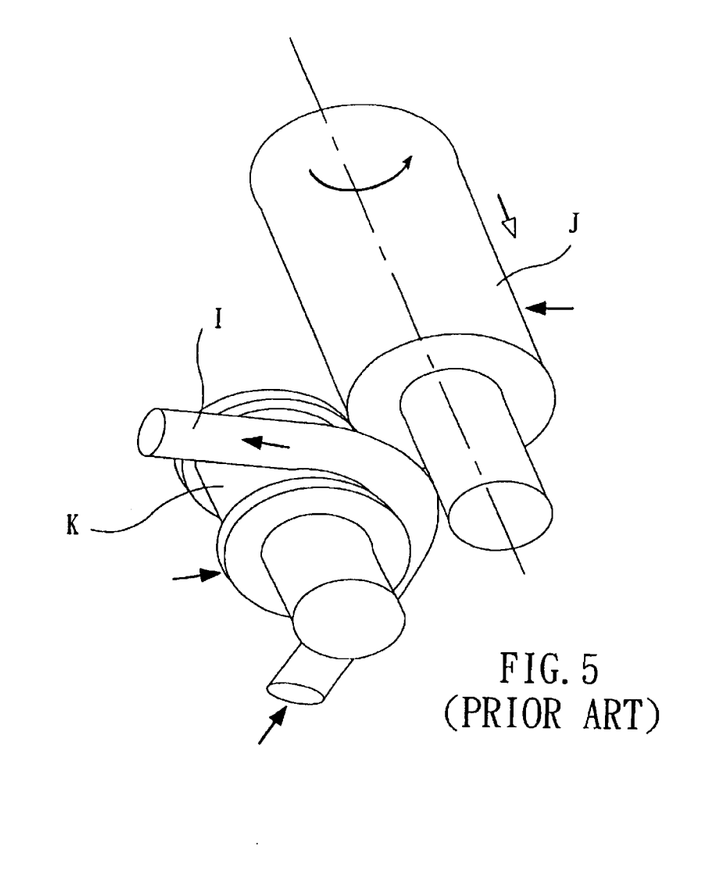
FIG. 5 is a schematic diagram showing a conventional wire electrical discharge grinding.

The conventional wire electrical discharge grinding applies the principle of the foregoing WEDM. As seen in FIG. 5, a brass wire I is used as the tool electrode and is connected to the cathode for processing an work piece, that is the anode electrode J. The grinding method is designed to maintain a gap between the tool and the workpiece in order to ensure electric-discharge between them, and new discharging surface of the brass wire I is in constant supply by the continuing movement of the brass wire I within the rail K in a constant speed. The length and diameter of the electrode J are entirely dependent on the position of the wire rail, so the electrode J may machine to the required micro dimension.

An improvement shown in FIG. 5 is the design of the wire guide K for replacing the wire guides of FIG. 3. Since the brass wire I is continuously and slowly moved in the wire rail K and is supported and restricted by the same, there is less swing of the brass wire during machining and thus a higher machining precision may be obtained. However, the design is restricted by the diameter of the wire, and the machined shape is also limited to cylindrical shape only that can not be used to machine a non-cylindrical-shaped electrode. In addition, the dimension of the brass wire acted as the wire electrode is restricted, that is, the thinner the brass wire is, the more difficult it will be for machining.

SUMMARY OF THE INVENTION

The primary object of the invention is to provide a microelectrode machining device mainly consisted of a wire guide with rail, and capable of enabling a smooth movement of the wire therein so as to reduce the vibration caused by the movement and thus increase the machining precision of the microelectrode, wherein the rail is made insulating and wear-proofing materials, such that not only may the working life span thereof be prolonged, but also may the success rate of machining a microelectrode be enhanced.

The secondary object of the invention is to provide a microelectrode machining device capable of processing a microelectrode grinding procedure on an EDM machine or Micro-EDM machine, and also capable of being set up and maintained with ease by applying a modularized design thereon.

Another objective of the invention is to provide a microelectrode machining device, wherein the speed and the tension of the wire can be effectively adjusted using the mechanism of the device, such that operators of the device can adjust the tension and the speed of the wire according to the size and shape of microelectrode to be machined for obtaining an optimal machining effect.

Yet another objective of the invention is to provide a microelectrode machining device, wherein the design of the wire guide enables the capability of machining a non-column electrode.

To achieve the aforementioned objectives, the invention provides a microelectrode machining device adopting a modularized design, comprising a platform, a wire supply mechanism, at least an electric conductor element, a wire guide, and a tension-adjusting mechanism, wherein the wire supply mechanism further is composed of a wire spool, a used wire spool, and a motor. During the machining procedure, the appropriate wire tension and the moving speed may be achieved by adjusting the parameters of a tension wheel and a torque motor of the invention, and the used wire may be recovered and stored in the used wire spool. The wire is moved first out of the wire spool, and passing the tension wheel to the guiding wheel to be straightened, then is fed and passing through the wire guide by way of the electric conductor element, and finally is recovered by the used wire spool. The microelectrode to be machined is electric-discharged grinding at the arch-slide with V-shaped section disposed on the wire guide. Since the track of the arch-slide is a V-shaped arc, and two wheel-shaped electric conductor elements are respectively located at two sides of the arch-slide, the wire will be closely and subsequently come into contact with the track of the arch-slide when it is entering the track by way of the bottom of the electric conductor element, and consequently the wire is subject to a minute downward suppressing force so as to avoid the microelectrode to be damaged by the vibration of the wire during a machining process. Finally, the wire will pass through the wire tightening mechanism and be recovered in the used wire spool to finish the electrical discharge grinding process.

DETAILED DESCRIPTION OF THE INVENTION

For your esteemed members of reviewing committee to further understand and recognize the fulfilled functions and structural characteristics of the invention, several preferable embodiments cooperating with detailed description are presented as the follows.

Figure 6:
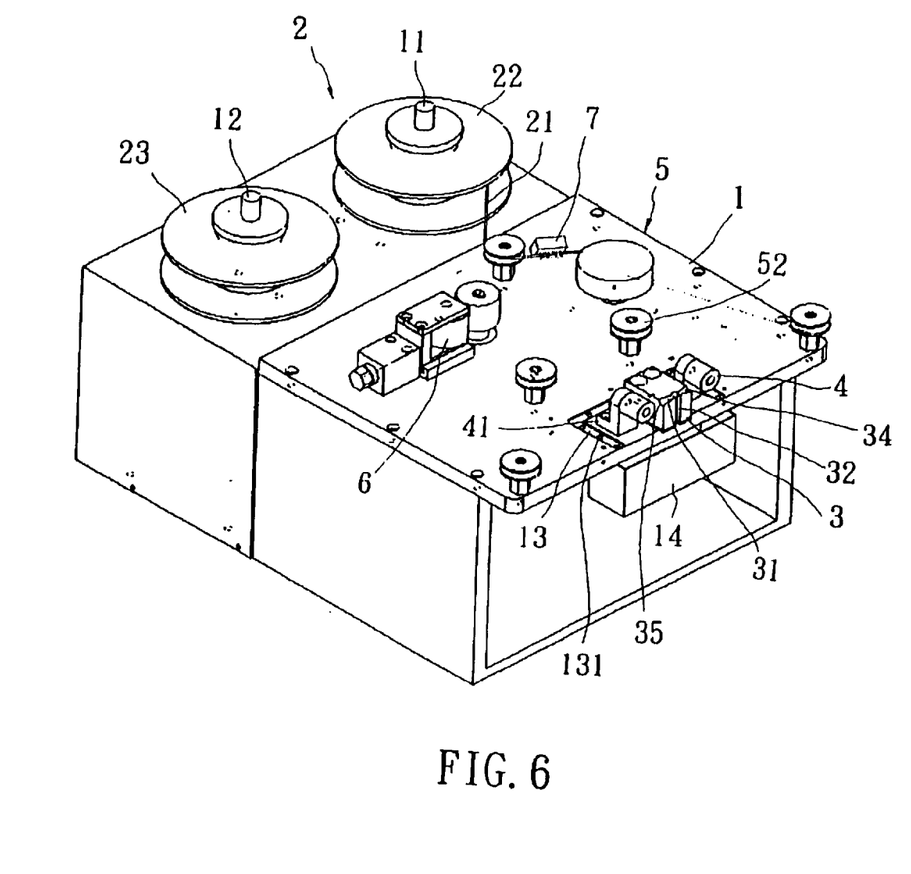
FIG. 6 is a 3-D view of the present invention.
Figure 7:
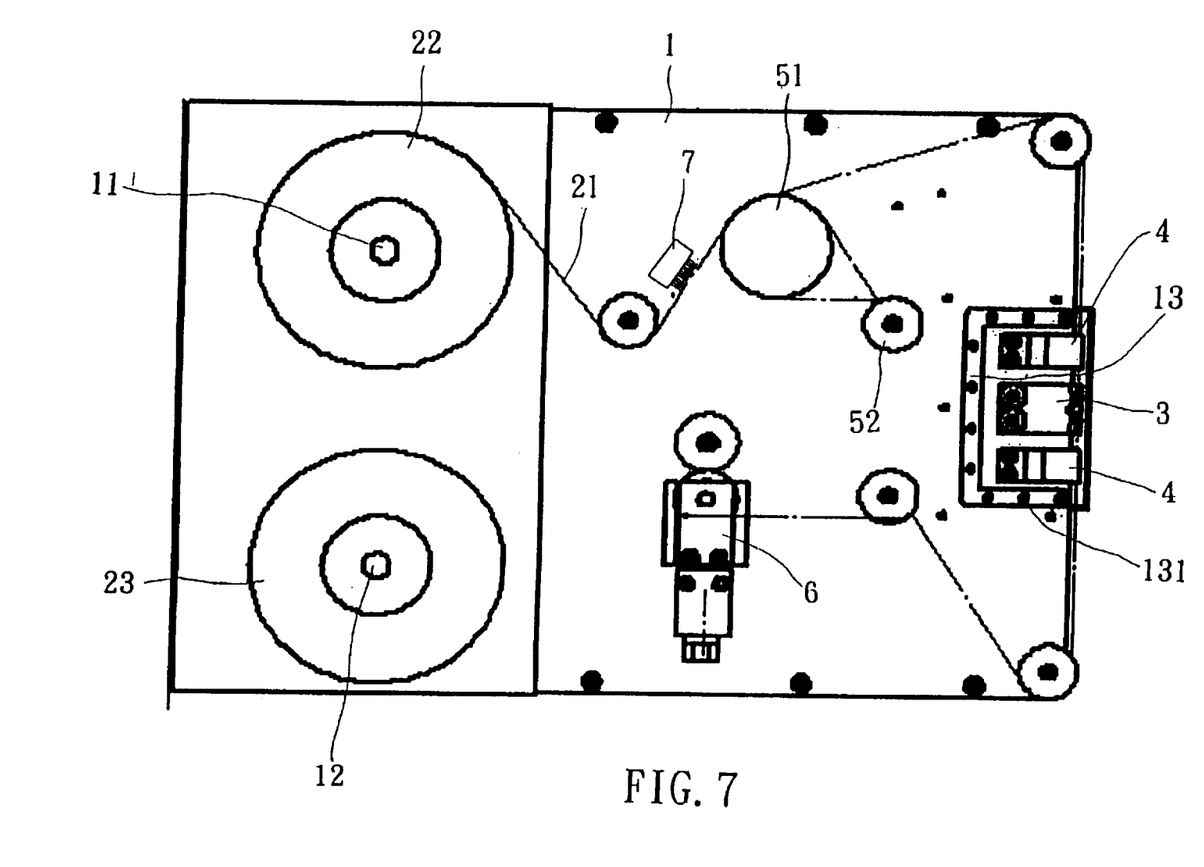
FIG. 7 is a top view of the present invention.
Figure 8:
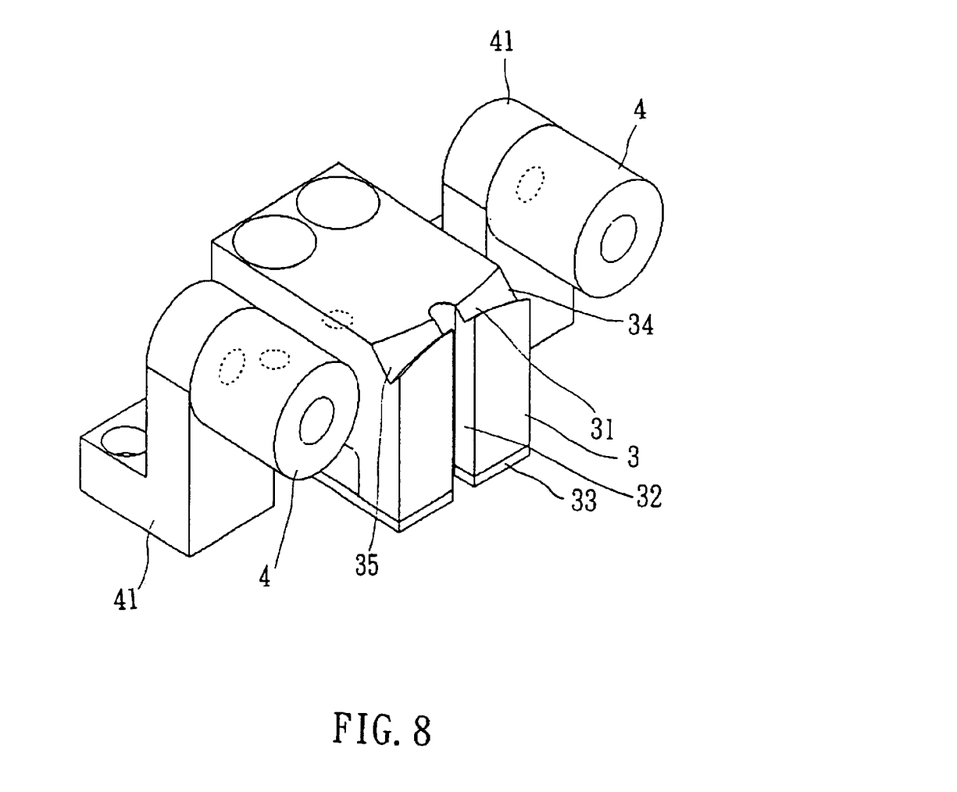
FIG. 8 is a 3-D of the wire guide and the electric conductor element of the present invention.

Please refer to FIG. 6 and FIG. 7, which are respectively the 3-D view and the top view of the present invention. The microelectrode machining device disclosed by the invention mainly comprises a platform 1, a wire supply mechanism 2, a wire guide 3, and two electric conductor elements 4, wherein the platform 1 can be fixed at an EDM machine (not shown in the figure), and the wire supply mechanism 2 is arranged on the platform 1 for providing the wire 21 needed in the EDM process, and the wire guide 3 disposed on the platform 1 has an arch-slide 31 arranged thereon (as shown in FIG. 8) and a groove 32 arranged at a position corresponding to the middle of the arch-slide 31 on the wire guide 3, in addition, the two electric conductor elements 4 are arranged on the platform 1 to supply the power needed in the EDM process, and the two electric conductor elements 4 are disposed respectively at the side of wire guide 3, and the altitudes of the bottom of both the wheel-shaped electric conductor element 4 are lower than that of the wire exit 35 and wire entrance 34 of the arch-slide 31 of the wire guide 3, in respective.

By the design of aforementioned structure, the wire 21 supplied by the wire supply mechanism 2 first passes through the bottom of the electric conductor element 4, and enters the arch-slide 31 from the wire entrance 34 and exits the same from the wire exit 35, and passes again through the bottom of another electric conductor element 4. In this way, the wire is subject to a minute downward suppressing force so that the wire can travel smoothly inside the arch-slide 31 of the wire guide 3. Comparing to the conventional structure, the structure of the present invention can provide a wire of high stability so as to obtain a better machining precision.

The arch-slide 31 of the present invention is an arc-shaped groove with V-shaped section that the V-shaped section of the arch-slide 31 enables the wires 31 of different diameters to be used, and the arc-shaped path enables a stable and smooth contact between the arch-slide 31 and the wire 21.

In addition, by the design of the wire guide 3, the microelectrode to be machined (not shown in the figure) can be machined by placing the microelectrode above the wire 21 or at a side of the wire 21. Hence, the invention may overcome the shortcoming of the conventional device, namely, it is impossible to perform a EDM process to an non-column electrode, and the invention is not restricted to the machining of column electrode only, and it can greatly argument its application field to further fulfill the requirement of the industry.

Furthermore, the electric conductor element 4 is supported and fixed to the platform 1 by a support frame 41 made of insulating materials. Moreover, there is an insulating plate 33 arranged between the wire guide 3 and the platform 1. The foregoing design can prevent the wire 21, the wire guide 3, and the electric conductor element 4 from conducting electricity to the platform 1, such that an occurrence of electric arc can be indeed prevented.

The wire supply mechanism 2 further comprises a wire spool 22, a used wire spool 23, and a motor (not shown), wherein the wire spool 22 is sheathed on a first rotary axis 11 arranged on the platform 1 to be rotated freely, and the used wore spool 23 is sheathed on a second rotary axis 12 arranged on the platform 1 and is being bringing along to rotate by the motor such that the wire 21 is enabled to proceed with the movement as described hereinbefore. The motor is a speed-reducing motor of lower rotating speed and the moving speed of the wire 21 can be adjusted by adjusting the rotating speed of the motor.

As seen in FIG. 6 and FIG. 7, a tension adjusting mechanism 5 is arranged between the wire supply mechanism 2 and the wire entrance 34 of the wire guide 3. The tension adjusting mechanism 5 is consisted of a tension wheel 51 and a tension motor (not shown), wherein tension wheel 51 is brought along to rotate by the tension motor, and the wire 21 coming out of the wire supply mechanism 2 is first wound through the tension wheel 51 and is then exiting from another side thereof.

Furthermore, a guiding wheel 52 is arranged at a side of the tension wheel 51, such that the wire 21 coming out of the wire supply mechanism 2 first passes through the tension wheel 51, then wound through the guiding wheel 52, and wound back to the tension wheel 51 again, and finally exits from another side of the tension wheel 51.

Using the foregoing tension adjusting mechanism 5, operators can change the rotating speed of the tension motor in the tension adjusting mechanism 5 to thereby achieve the objective of adjusting the tension of the wire 21 while keeping the rotating speed of the motor of the wire supply mechanism 2 unchanged.

In the process of recovering the wire 21 by the used wire spool 23, it is unavoidable for the wire 21 to have upward/downward displacements. Therefore, in order to keep the stability of the wire 21 moving at the wire guide 3, a wire tightening mechanism 6 is further arranged between the wire supply mechanism 2 and the wire exit 35 of the wire guide 3. By the arrangement of this wire tightening mechanism 6, it is possible to effectively and tightly hold the wire 21 to be positioned between the electric conductor element 4 and the used wire spool 23, such that the up/down displacement of the wire 21 can only happen between the used wire spool 23 and the wire tightening mechanism 6, and it is possible to maintain the stability of the wire 21 between the wire exit 35 of the wire guide 3 and the wire tightening mechanism 6.

In the present invention, to prevent the working liquid used by the EDM process from flowing around during the machining, a ditch 13 is arranged on the platform 1 surrounding the wire guide 3 and the electric conductor element 4, and a plurality of through holes 131 is arranged in the ditch 13, in addition, a working liquid collecting box 14 is arranged under the bottom of the platform 1 corresponding to the positions of the through holes. Thus, the working fluid may flow into the ditch 13 and then passes the through holes 31 arranged in the ditch trough 13 to thereby drop into the working fluid collecting box 14.

Moreover, a wire cleaning mechanism 7 is further arranged between the wire supply mechanism 2 and the wire entrance 34 of the wire guide 3. The wire cleaning mechanism 7 is used to proceed with a preliminary cleaning to the wire 21 coming out from the wire spool 22 for removing the ashes or oxides attached on the wire 21. The guiding-wire cleaning mechanism 7 can be of any conventional cleaning structure (for example, brush, roller, etc.).

The aforementioned descriptions are just preferable embodiments according to the invention, and the ranges covered by the invention are not restricted by embodiments shown by the invention, so any variation, made according to the content of the invention, having the function and characteristic similar to the embodiments of the invention, conceivable by those who are skilled in such arts, are all within the ranges covered by the invention.

In summary, the microelectrode machining device according to the invention is to change the structure of the wire guide and cooperate with the arrangement of tension adjusting mechanism and wire tightening mechanism to make the invention able to provide a more stable wire for obtaining a superior machining precision. Furthermore, the invention may perform an EDM process on non-column electrodes that is impossible using the convention device, thus, the present invention has a much larger application field. In addition, it is also easy to adjust the tension of the wire using the device of the present invention, and a modularized design of the present invention make it ease to be arranged on any conventional EDM machine or on an innovated EDM machine. Moreover, the invention has never been presented in any journal or public occasion, so there is no doubt about its novelty and progressiveness. The application of the invention is indeed fulfilled the merits regulated by the patent law so, please your esteemed members of reviewing committee afford time to review this patent application, and grant it a formal patent as soon as possible.

What is claimed is:

1. A microelectrode machining device, comprising:
    a platform, fixed on an electrical discharge machining table;
    a wire supply mechanism, disposed on the platform for supplying wires needed by an electrical discharge machining process;
    a wire guide, disposed on the platform, and having a slide arranged thereon and a groove arranged at a position corresponding to the middle of the slide; and
    two electric conductor elements, disposed respectively at the side of wire guide on the platform, and both the altitudes of the bottom thereof are lower than that of the two ends of the slide of the wire guide, in respective;
    wherein, the wire supplied by the wire supply mechanism first passes through the bottom of the electric conductor element, and enters the slide by one end thereof, that is, a wire entrance, and exits the same by another end thereof, that is, a wire exit, and then passes through the bottom of another electric conductor element, such that the wire is subject to a minute downward suppressing force which cooperates with the slide of the wire guide for enabling the wire to pass through the wire guide smoothly.

2. The microelectrode machining device according to claim 1, wherein the wire supply mechanism further comprises:
    a motor;
    a wire spool, sheathed on a first rotary axis arranged on the platform to be rotated freely; and
    a used wire spool, sheathed on a second rotary axis arranged on the platform, being brought along to rotate by the motor.

3. The microelectrode machining device according to claim 2, wherein the motor is a speed-reducing motor.

4. The microelectrode machining device according to claim 1, wherein an insulating plate is arranged between the wire guide and the platform.

5. The microelectrode machining device according to claim 1, wherein the wire guide is made of an insulating material with high wear-proofing ability.

6. The microelectrode machining device according to claim 5, wherein the wire guide is made of a ceramic material.

7. The microelectrode machining device according to claim 1, wherein a tension adjusting mechanism disposed on the platform is further arranged between the wire supply mechanism and the wire entrance of the wire guide.

8. The microelectrode-machining device according to claim 7, wherein the tension adjusting mechanism is consisted of a tension wheel and a tension motor, and the tension wheel is brought along to rotate by the tension motor, and the wire coming out of the wire supply mechanism is first wound through the tension wheel and is then exiting from another side thereof.

9. The microelectrode machining device according to claim 8, wherein a guiding wheel is further arranged at a side of the tension wheel, such that the wire coming out of the wire supply mechanism first passes through the tension wheel, then wounds through the guiding wheel, and wounds back to the tension wheel again, and finally exits from another side of the tension wheel.

10. The microelectrode machining device according to claim 1, wherein a ditch is arranged on the platform surrounding the wire guide and the electric conductor element, and a plurality of through holes is further arranged in the ditch, and a working liquid collecting box is arranged under the bottom of the platform corresponding to the positions of the through holes.

11. The microelectrode machining device according to claim 1, wherein the electric conductor element is supported and fixed to the platform by a support frame made of insulating materials.

12. The microelectrode-machining device according to claim 1, wherein a wire tightening mechanism disposed on the platform is further arranged between the wire supply mechanism and the wire exit of the wire guide.

13. The microelectrode machining device according to claim 1, wherein a wire cleaning mechanism disposed on the platform is further arranged between the wire supply mechanism and the wire entrance of the wire guide.

14. The microelectrode-machining device according to claim 13, wherein the wire cleaning mechanism is a brush.

15. The microelectrode-machining device according to claim 1, wherein the slide arranged at wire guide is an arc-shaped groove with V-shaped section.

\* \* \* \* \*